United States Patent
Maas et al.

(10) Patent No.: US 10,942,974 B2
(45) Date of Patent: Mar. 9, 2021

(54) SYSTEM FOR SYNCHRONOUS DOCUMENT CAPTURES INTO AN ASYNCHRONOUS ARCHIVE AND DOCUMENT-LEVEL ARCHIVING RECONCILIATION

(71) Applicant: Bank of America Corporation, Charlotte, NC (US)

(72) Inventors: Steven Jacob Maas, Sterling Heights, MI (US); Scott Dion Floyd, Cumming, GA (US); Shyaam Sundar Neelam, Atlanta, GA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 291 days.

(21) Appl. No.: 15/789,298

(22) Filed: Oct. 20, 2017

(65) Prior Publication Data

US 2019/0121865 A1 Apr. 25, 2019

(51) Int. Cl.
| | |
|---|---|
| G06F 16/93 | (2019.01) |
| G06F 16/31 | (2019.01) |
| G06F 16/50 | (2019.01) |
| G06F 16/11 | (2019.01) |
| H04L 29/08 | (2006.01) |

(52) U.S. Cl.
CPC ............ *G06F 16/93* (2019.01); *G06F 16/113* (2019.01); *G06F 16/31* (2019.01); *G06F 16/50* (2019.01); *H04L 67/1095* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 5,023,832 A | 6/1991 | Fulcher et al. | |
| 5,530,899 A | 6/1996 | MacDonald | |
| 5,917,965 A * | 6/1999 | Cahill ................... | G06K 9/033 |
| | | | 382/305 |
| 6,144,999 A | 11/2000 | Khalidi et al. | |
| 6,163,856 A | 12/2000 | Dion et al. | |
| 6,453,325 B1 | 9/2002 | Cabrera et al. | |
| 6,662,198 B2 | 12/2003 | Satyanarayanan et al. | |
| 6,691,139 B2 | 2/2004 | Ganesh et al. | |

(Continued)

*Primary Examiner* — Tony Mahmoudi
*Assistant Examiner* — Umar Mian
(74) *Attorney, Agent, or Firm* — Michael A. Springs; Moore & Van Allen PLLC; James C. Edwards (57) ABSTRACT

A system, method and the like for synchronous document captures into an asynchronous archive and document-level reconciliation of the archive process. Once a document requiring archiving has been captured and validated, the client is immediately notified that the document has been accepted into the archiving system and that archiving will ensue. Once the batch mode archiving process has been completed, the client is notified, at the document/individual request-level of the completion of the archive process. Additionally, the archiving system is transparent to the clients in terms of system changes, capable of mitigating system errors and/or notifying clients of system errors, adaptable to allow for any format of web service call requesting document archiving, allows for different types of documents having different index/metadata to be processed without a database schema change and allows users to configure archive process attributes on a per document, or per document-type basis.

15 Claims, 7 Drawing Sheets

(56) References Cited

U.S. PATENT DOCUMENTS

| | | |
|---|---|---|
| 6,964,040 B2 | 11/2005 | Osborn |
| 6,978,297 B1 | 12/2005 | Piersol |
| 7,103,619 B1 | 9/2006 | Rajpurkar et al. |
| 7,136,976 B2 | 11/2006 | Saika |
| 7,197,502 B2 | 3/2007 | Feinsmith |
| 7,260,590 B1 | 8/2007 | Williams |
| 7,529,784 B2 | 5/2009 | Kavuri et al. |
| 7,669,022 B2 | 2/2010 | Maruyama et al. |
| 8,364,648 B1 | 1/2013 | Sim-Tang |
| 8,392,923 B2 | 3/2013 | Walters |
| 9,223,843 B1 | 12/2015 | Madhavarapu et al. |
| 2003/0043186 A1* | 3/2003 | Libman ............... H04L 51/06 715/748 |
| 2005/0144189 A1* | 6/2005 | Edwards .............. G06F 16/185 |
| 2005/0289182 A1 | 12/2005 | Pandian et al. |
| 2008/0263607 A1 | 10/2008 | Gurevich et al. |
| 2009/0327352 A1 | 12/2009 | Thomas et al. |
| 2016/0085797 A1* | 3/2016 | Patiejunas ........... G06F 21/606 707/690 |

* cited by examiner

FIG. 7

SYSTEM FOR SYNCHRONOUS DOCUMENT CAPTURES INTO AN ASYNCHRONOUS ARCHIVE AND DOCUMENT-LEVEL ARCHIVING RECONCILIATION

FIELD OF THE INVENTION

The present invention is generally directed to computerized data storage and, more specifically, receiving individual documents requiring archiving and, at prescribed intervals, batch process archiving documents of a like type, while providing the archiving entity reconciliation in the form of confirmation that the document has been accepted for archiving and that archiving has been completed.

BACKGROUND

Many large enterprises have a need to archive a large volume of documents on an ongoing basis. For example, financial institutions, are constantly archiving a large volume of different types of documents, such as signature cards, legal documents or the like that are received from various different input channels (e.g., a physical location, such as a branch, an online channel, a mobile channel and the like).

In practice, single documents may be generated and executed on an as needed basis with a desire to have the document archived as soon as possible. However, typical archiving processing operates in a batch mode, meaning that large volumes of like-type documents requiring archiving are received over a period of time (i.e., a business day or the like) and subsequently the entire "batch" of like-type documents are documents are archived simultaneously. However, such batch mode archiving of documents does not provide the user (i.e., the individual or client application requesting the archiving of a document) immediate indication that a document has been accepted for archiving or confirmation, within a reasonable period of time (e.g., while the individual/client is still engaged) that the archiving has been successfully completed.

Moreover, in current archiving systems various system errors/failure points exist that may prohibit or at least prolong the completion of the archiving process. If these system failures are not corrected in-process, the client needs to be notified of such a failure so that they become aware that the archiving process has failed (and thus re-submission of the document of required) or, at least, delayed.

In addition, in large enterprises in which many different types of documents are archived, each document type will have different index/metadata associated with the document and the archiving process needs to flexible enough to not only accommodate these differences in existing document types but also readily accept new document types having new or different index/metadata.

Additionally, each individual/client requesting document archiving and/or each document type may have different requirements in terms of how and when the archiving is performed, how documents are formatted for conversion to a batch file, archiving destinations/locations and delivery mechanisms for reconciliation (e.g., protocols used for audit file (i.e., archive confirmation) delivery) and the like.

Therefore, a need exists to develop an archiving system that will address the aforementioned problems. Specifically, the desired archiving system should provide the client (i.e., the archive requesting entity) with immediate indication that a document has been accepted for archiving and confirmation, within a reasonable period of time (e.g., while the individual/client is still engaged) that the archiving has been successfully completed. Moreover, the desired system should be self-correcting in the event of a system error failure that would delay or otherwise prohibit completion of the archive process, or, alternatively notify the client of such errors. In addition, the desired archiving system should readily accommodate differences in document types, such that new document types can be easily added to the system without requiring systematic changes. Additionally, the desired system should allow for users to define, criteria for archiving on a client-basis, a document type-basis and in some embodiments on a specific individual document archive request-basis.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing systems, methods, computer program product and/or the like for archiving documents and related reconciliation. Specifically, the present invention provides for synchronous document captures into an asynchronous archive and document-level reconciliation of the archive process.

In this regard, according to the present invention once a document requiring archiving has been captured and validated, the system provides for immediate notification to the client (i.e., the archive requesting entity) that the document has been accepted into the archiving system and that archiving will ensue. In addition, once the batch mode archiving process has been completed, the present invention provides for notifying the client of the completion of the archive process, specifically with such notification identifying the specific individual archive requests (i.e., individual documents) included in the batch mode archive process. Moreover, since the batch mode archiving processes occur more readily (e.g., hourly or more frequently), the client is notified of completion of the archive process in timely fashion (e.g., while the client is still engaged or the like).

Additionally, the system is adaptable to allow for documents to be ingested via any type of web service format, including but not limited to SOAP (Simple Object Access Protocol) and RESTful (Representational State Transfer) web service calls. Further, the client applications are insulated from the archiving system of the present invention, such that changes to the archiving system are transparent to the client application and require no client-side changes.

In addition, embodiments of the present invention provide for self-mitigating system errors that may prohibit or otherwise delay the archive process. For example, in some embodiments of the invention, in the event that a database that stores document records (i.e., index/metadata or the like) is unavailable due to a system outage, the index/metadata may be written to a temporary object file and, once the database becomes available, the object file is converted into the document record and normal processing ensues. In the event of other system failures in which mitigation is not possible, the system provides for notifying the client of the failure and/or the need to re-submit the archive request at a later point in time. In addition, embodiments of the present invention, provide for re-delivery of a document to the archive for documents requiring such. Such re-delivery is made possible by the system accepting and writing the index data into a document record stored in database, if re-delivery of is required, the status of the document record is reset back to a start status and the document is subsequently collected during the next-in-time batch process cycle.

Further, embodiments of the present invention allow for different types of documents having different index/metadata to be incorporated into the archiving system without the need to modify the database schema. Such acceptance of different document types/different metadata is made possible by index/metadata attributes being treated as name/value pairs that are readily attached to the base document record in the index database.

Moreover, the present invention provides for a user interface module (e.g., management console) that allows a user (i.e., an entity requesting archiving) to configure a document archiving process specific to the client, a document type and/or a specific individual document. In this regard the user interface module is configured to allow the user to configure/select archiving process attributes, including but not limited to, period of time between archiving cycles/batch processing, start times for a batch process, option for file conversion prior to archiving, archive file options for delivery to the archive, archive destination parameters, delivery protocols and auditing/reconciliation options.

A system for archiving documents and subsequent reconciliation of the archiving defines first embodiments of the invention. The system includes a first computing platform having a first memory and one or more first processors in communication with the first memory. The system further includes a client application that is stored in the first memory and executable by the one or more first processors. The client application is configured to capture a document requiring archiving and initiate a web service call for communicating an archiving request. The archiving request includes (i) index data associated with the document, (ii) image data of the document, and (iii) a request identifier that identifies the archiving request.

The system further includes a second computing platform having a second memory and one or more second processors in communication with the second memory. In addition, the system includes an archiving application that is stored in the second memory and executable by the one or more second processors, The archiving application includes an interface layer configured to (i) receive the web service call including the archiving request, (ii) validate the index data and the image data of the document, and (iii) communicate a validation response to the client application that includes the request identifier and a validation code. The archiving application further includes a storage layer configured to store the index data as a document record in a first database and the image data in a second database. In addition, the archiving application includes an archiving service layer configured to (i) capture, on a predetermined interval, for individual document types, index data stored in the first data database and associated image data stored in the second database. The captured index data and image data is associated with a plurality of archiving requests, (ii) create a batch file comprising the captured index data and image data, and, (iii) in response to delivering the batch file to archive storage, receive and communicate an audit file to the client application that includes the request identifier and validation code for each of the plurality of archiving requests.

In further specific embodiments of the invention, the archiving application further comprises a user interface module configured to allow a user to define a batch processing attributes based on at least one of the document, a document type, or client requirements. In such embodiments of the system, the batch processing attributes may include one or more of the predetermined interval, a batch processing start time, file format conversion options, batch file options, audit file delivery protocols, archive destination parameters and auditing parameters.

In still further embodiments the system includes a third computing platform having a third memory and one or more third processors. In addition, the system includes an authentication application that is stored in the third memory and executable by the third processors. The authentication application includes an authentication layer configured to receive the web service call from the client application and authorize the client application to conduct the web service call with the archiving application. The authentication application further comprises a routing layer configured to determine and route the web service call to a designated location within the interface layer of the archiving application.

In additional specific embodiments of the system, the interface layer of the archiving application is further configured to, in response to being unable to validate at least one of the index data or the image data, communicate an invalidation response to the client application that includes the unique identifier and an invalidation code. In further related embodiments of the system, the interface layer of the archiving application is further configured to, in response to determining that the first database is in an unavailable state, store the index data in a temporary object file. In such embodiments the interface layer of the archiving application is further configured to, in response to determining that the first database has moved from the unavailable state to an available state, convert the temporary object file into the document record and store the document record in the first database.

Additionally, in further embodiments of the system, the archiving service layer is further configured to, in response to determining that a system error is occurring that affects interface layer processing, capture, during a next-in-time predetermined interval, the index data stored in the first data database and the associated image data stored in the second database. In further elated embodiments of the invention, the archiving application is further configured to, in response to determining that a system error is occurring that affects interface layer processing, generate and communicate an alert to at least the client application that notifies the client application of a delay in processing the archive request or requests that the archive request be re-sent at a later point in time.

Moreover, in further embodiments of the system the archiving service layer is further configured to, in response to delivering the batch file to archive storage and receiving the audit file, update a database status code in the document record for each document in the batch file to indicate completion of archiving or a failure to archive.

In further specific embodiments of the system the interface layer of the archiving application is configurable to receive the web service call in any one of a plurality of web service formats.

A method for archiving documents and subsequently reconciling the archiving defines second embodiments of the invention. The method is implemented by one or more computing processors and includes receiving a web service call requesting archiving of a document. The archiving request includes (i) index data associated with the document, (ii) image data of the document, and (iii) a request identifier that identifies the archiving request. The method further includes validating the index data and the image data of the document and communicate a validation response to the client application that includes the request identifier and a validation code. In addition the method includes storing the index data as a document record in a first database and the image data in a second database. Further, the method includes capturing, on a predetermined interval, for individual document types, index data stored in the first data database and associated image data stored in the second database. The captured index data and image data is associated with a plurality of archiving requests and creating a batch file comprising the captured index data and image data. Additionally, the method includes, in response to delivering the batch file to archive storage, communicate an audit file to the client application that includes the request identifier and validation code for each of the plurality of archiving requests.

In specific embodiments the method further includes providing a user interface configured to allow a user to define a batch processing attributes based on document type, wherein the batch processing attributes include one or more of the predetermined interval, a batch processing start time, file format conversion options, batch file options, audit file delivery protocols, archive destination parameters and auditing parameters.

In other specific embodiments the method includes, prior to receiving the web service call: authorizing the web service call, and determining routing for the web service call.

In still further embodiments of the method includes, in response to being unable to validate at least one of the index data or the image data, communicating an invalidation response to the client application that includes the unique identifier and a invalidation code.

In other specific embodiments the method includes, in response to determining that the first database is in an unavailable state, storing the index data in a temporary object file; and in response to determining that the first database has moved from the unavailable state to an available state, converting the temporary object files into the document record and store the document record in the first database.

Additionally, in other embodiments the method includes, in response to determining that a system error is occurring that affects interface layer processing: capturing, during a next-in-time predetermined interval, the index data stored in the first data database and the associated image data stored in the second database; and generating and initiating communication of an alert to at least the client application that notifies the client application of a delay in processing the archive request or requests that the archive request be re-sent at a later point in time.

A computer program product including a non-transitory computer-readable medium defines third embodiments of the invention. The computer-readable medium includes a first set of codes for causing a computer to receive a web service call requesting archiving of a document. The archiving request includes (i) index data associated with the document, (ii) image data of the document, and (iii) a request identifier that identifies the archiving request. The computer-readable medium additionally includes a second set of codes for causing a computer to validate the index data and the image data of the document and a third set of codes for causing a computer to communicate a validation response to the client application that includes the request identifier and a validation code. In addition, the computer-readable medium includes a fourth set of codes for causing a computer to store the index data as a document record in a first database and the image data in a second database, Moreover, the computer-readable medium includes a fifth set of codes for causing a computer to capture, on a predetermined interval, for individual document types, index data stored in the first data database and associated image data stored in the second database. The captured index data and image data is associated with a plurality of archiving requests. Additionally, the computer-readable medium includes a sixth set of codes for causing a computer to create a batch file comprising the captured index data and image data, and a seventh set of codes for causing a computer to, in response to delivering the batch file to archive storage, communicate an audit file to the client application that includes the request identifier and validation code for each of the plurality of archiving requests.

Thus, according to embodiments of the invention, which will be discussed in greater detail below, the present invention provides synchronous document captures into an asynchronous archive and document-level reconciliation of the archive process. In this regard, according to the present invention once a document requiring archiving has been captured and validated, the system provides for immediate notification to the client that the document has been accepted into the archiving system and that archiving will ensue. In addition, once the batch mode archiving process has been completed, the present invention provides for notifying the client of the completion of the archive process, specifically with such notification identifying the specific individual archive requests included in the batch mode archive process. Since the batch mode archiving processes occur more readily (e.g., hourly or more frequently), the client is notified of completion of the archive process in a timely fashion (e.g., while the client is still engaged or the like). Additionally, the present invention provides for an archiving system that is transparent to the clients in terms of system changes, capable of mitigating system errors and/or notifying clients of system errors, adaptable to allow for any format of web service call requesting document archiving, allows for different types of documents having different index/metadata to be processed without a database schema change and allows users to configure archive process attributes on a per document, or per document-type basis.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, providing systems, methods, computer program product and/or the like for archiving documents and related reconciliation. Specifically, once a document requiring archiving has been captured and validated, the system provides for immediate notification to the client (i.e., the archive requesting entity) that the document has been accepted into the archiving system and that archiving will ensue. In addition, once the batch-mode archiving process has been completed, the present invention provides for notifying the client of the completion of the archive process, specifically with such notification identifying the specific individual archive requests (i.e., individual documents) included in the batch mode archive process.

Additionally, the system is adaptable to allow for documents to be ingested via any type of web service format, including but not limited to SOAP (Simple Object Access Protocol) and RESTful (Representational State Transfer) web service calls. Further, in embodiments of the present invention, the client applications (document upload entities) are insulated from the archiving system, such that changes to the archiving system are transparent to the client application and require no client-side changes.

In addition, embodiments of the present invention provide for self-mitigating system errors that may prohibit or otherwise delay the archive process. For example, in some embodiments of the invention, in the event that a database that stores document records (i.e., index/metadata or the like) is unavailable due to a system outage, the index/metadata may be written to a temporary object file and, once the database becomes available, the object file is converted into the document record and normal processing ensues. In the event of other system failures in which self-mitigation is not available or possible, the system provides for notifying the client of the failure and/or the need to re-submit the archive request at a later point in time. In addition, embodiments of the present invention, provide for re-delivery of a document to the archive in the event that a system error or the like prevents archiving of a document. Such re-delivery is made possible by the system accepting and writing the index data into a document record stored in database, if re-delivery is required, the status of the document record is reset back to a start status and the document is subsequently collected during the next-in-time batch process.

Further, embodiments of the present invention allow for different types of documents having different index/metadata to be incorporated into the archiving system without the need to modify the database schema. Such acceptance of different document types/different metadata is made possible by index/metadata attributes being treated as name/value pairs that are readily attached to the base document record in the index database.

Moreover, the present invention provides for a user interface module (e.g., management console) that allows a user (i.e., an entity requesting archiving) to configure a document archiving process specific to the client, a document type and/or a specific individual document. In this regard the user interface module is configured to allow the user to configure/select archiving process attributes, including but not limited to, period of time between archiving cycles/batch processing, start times for a batch process, option for file conversion prior to archiving, archive file options for delivery to the archive, archive destination parameters, delivery protocols and auditing/reconciliation options.

Figure 1:
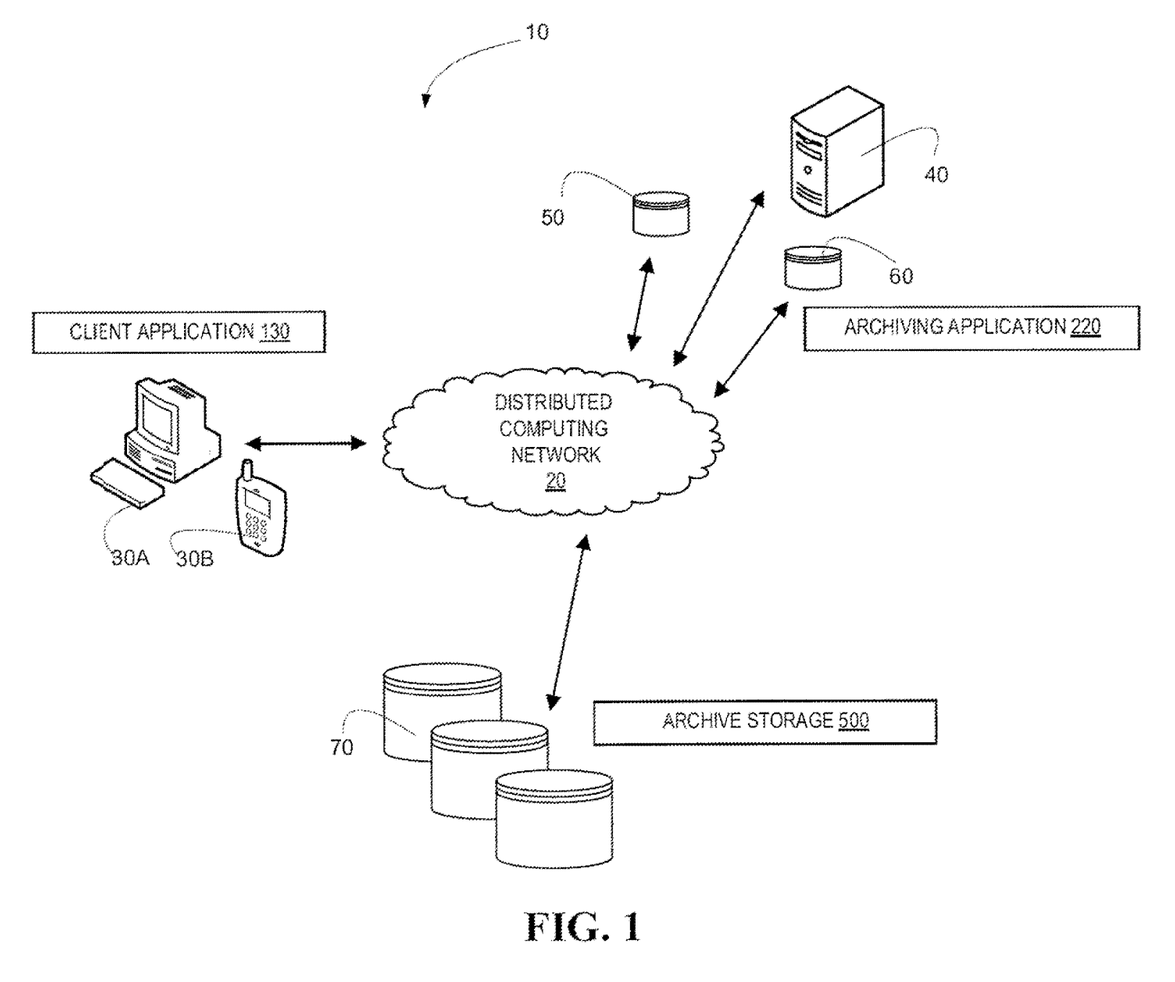
FIG. 1 provides a schematic diagram of a system for archiving documents and providing document-level archiving reconciliation, in accordance with embodiments of the invention.

Referring to FIG. 1 a schematic diagram is shown of a system 10 for archiving documents and providing document-level archiving reconciliation, in accordance with embodiments of the present invention. The system 10 is operated within a distributed computing network 20 that may include the Internet, and/or cellular network(s) and/or intranets. The system includes a client application 130 which may be executed on or accessible via any device having network connectivity, such as personal computer 30A or a mobile communication device 30B. The client application 130 may be any application that is configured to provide access to distributed computing network 20, such as an online application, a mobile application or the like. Additionally the client application 130 is configured to receive documents that require archiving. The document may be a physical document which requires image capturing or some other form of electronic intake or the document may already be in electronic document format.

The system additionally includes archiving application 220 that is configured to receive the data associated with the electronic document (i.e., index/metadata as well as image data) from the client application 130 via the distributed computing network 20 and perform batch process archiving of the document into the archive storage 500. Specifically, according to embodiments of the invention, the archiving application 220, is configured to, upon receipt of the electronic document data, validate the data and store the data in one or more databases 50 and 60. Once the data has been validated and stored, the archiving application generates and communicates an archive validation response to the client that informs the client application that the data has been validated and that the subsequent batch process archiving will ensue. The client application will typically receive the archive validation response within a few seconds of communicating the data associated with the electronic document, in this regard, the client application has immediate assurance that the document data is valid and that archiving of the document will occur. Additionally, once the archiving application 220 has performed the batch process archiving of the document, the archiving application 220 is configured to communicate an audit file to the client application 130 that identifies the documents in a batch file that have been archived, so that the client application 130 has confirmation of the occurrence of the archiving of a document. In typically archiving environments, in which the batch processing occurs in minimal intervals (e.g., equal to or less than 15 minutes), the client application 130 will receive the audit file while the user of the client application 130 is still engaged (e.g., within approximately 60 minutes or sooner). In this regard, according to embodiments of the present invention, the system 10 provides for immediate reconciliation of document validation and ensuing archiving, as well as, subsequent reconciliation of the actual archiving within a likely period of time in which the user is still engaged within the client application.

Figure 2:
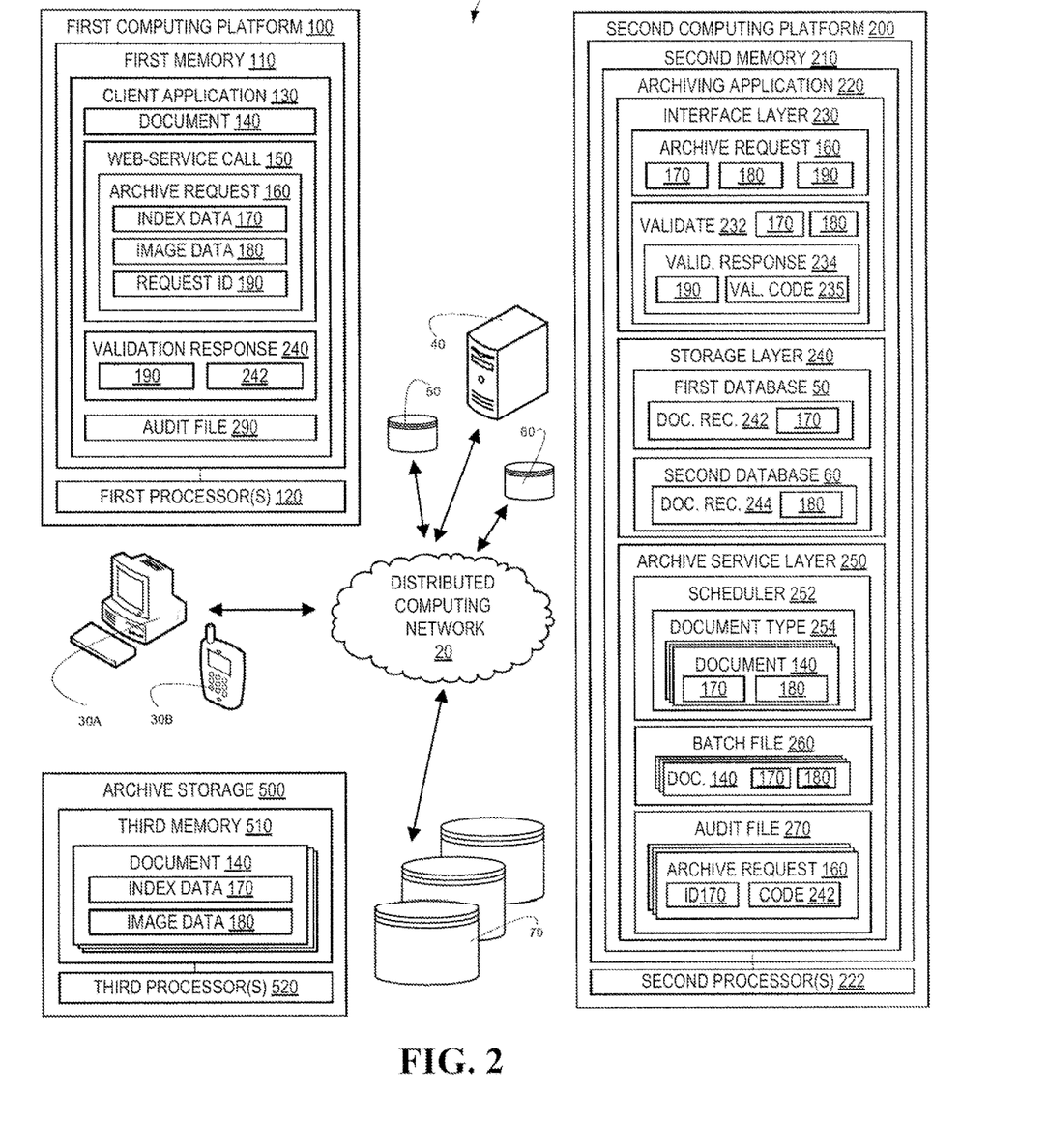
FIG. 2 provides a more detailed schematic diagram of a system for archiving documents and providing document-level archiving reconciliation, in accordance with alternate embodiments of the invention.

Referring to FIG. 2 a more detailed schematic diagram is shown of a system 10 for archiving documents and providing document-level archiving reconciliation, in accordance with embodiments of the present invention. As previously discussed system 10 is implemented via a distributed computing network 20 that may include the Internet, one or more cellular networks, and/or intranets working in unison to communicate data.

The system 10 includes a first computing platform 100 including a first memory 110 and at least one first processor 120 in communication with the first memory 110. The first computing platform 100 may include computing devices such as personal computing device 30A or mobile device 30B. In addition, first computing platform 100 may include a network-based server (not shown in FIG. 2), which may be traditional network-based and/or cloud-based, for executing all or part of client application 130.

The first memory 110 of first computing platform 100 stores client application 130 which is executable via one or more first processors 120. As previously discussed, client application may be any application configured to transmit and receive data via the distributed computing network 20 and configured to receive a document 140 that requires archiving. In this regard the client application 130 may be an online application, a mobile application or the like. In those embodiments of the invention in which the client application 130 is associated with a financial institution, the client application may be an online banking application, a mobile banking application or any other internal application requiring document archiving (e.g., customer onboarding, loan approval processing and the like). The client application 130 may receive the document in electronic form via the distributed computing network 20 or may capture images of physical/paper documents that require archiving. In the financial institution environment, the documents may include but are not limited to signature cards, legal documents, loan application documents and the like.

The client application 130 is configured to initiate a web service call 150 that includes an archive request 160 for archiving one or more documents 140. The web service call may can be adapted to any requested web service format, for example, SOAP (Simple Object Access Protocol) and RESTful (Representational State Transfer) protocols may be used for web service calls. The archive request 160 includes index data 170 (i.e., metadata) associated with the document, image data 180 of the documents as well as a request identifier 190 (i.e., a unique numeric or alphanumeric identifier that serves to identify the archive request). Prior to receipt of the web service call by the archiving application 220, the web service call may be authenticated by an authentication layer and routed by a routing layer to a proper URL (Universal Resource Locator) associated with the second computing platform 200, such authentication and routing may be performed by an Enterprise Interface Builder (EIB), Data Gateway (DGW) or the like.

The system 10 additionally includes a second computing platform 200 including a second memory 210 and at least one second processor 220 in communication with the second memory 210. The second computing platform 200 may include network devices such as one or more servers 40 and one or more databases 50 or 60. In addition, second computing platform 200 may include a network-based server (not shown in FIG. 2), which may tradition network-based and/or cloud-based, for executing all or part of client application 130. The second computing platform 200 may comprise traditional network-based devices, servers and the like and/or cloud-based services, for executing all or part of archiving application 230.

The second memory 210 of second computing platform 200 stores archiving application 220 that is executable by one or more second processors 222. An interface layer 230 of the archiving application is configured to receive the web service call 150 including the archive request 160 and validate 232 the index data 170 and image data 180 included in the archive request 160. Validation 232 may include, but is not limited to, verifying that the index data 170 is accurate (i.e., includes requisite data) and that the image data 180 is readable and able to be stored.

Archiving application 220 additionally includes storage layer 240 that includes one or more databases, such as first database 50 and second database 60. In specific embodiments of the invention, first database 50 may be configured to create and store a document record/entry 242 for each archive request 160 and store the index data 170 in the corresponding document record 242. Second database 60, which may be part of a Network-Attached Storage (NAS) shared file system may be configured to create and store a document record/entry 244 for each archive request 160 and store the image data 180 in the corresponding document record 244. As will be discussed infra., in the event that one of the databases is unavailable/down due to system outage or the like, the archiving application 130 is configured to create and temporarily store a text/metadata file or, in some embodiments, an image file. Once the database becomes available again, the text/metadata file or image file is converted into a database record 242, 244 and normal processing ensues. Such creation of the temporary text/metadata file and/or image file eliminates a database outage as a catastrophic failure point.

In response to validating 232 the index data 170 and the image data 180, the interface layer 230 of the archiving application is configured to generate and initiate communication of a validation response 234 to the client application 130. The validation response 234 includes, but is not limited to, the request identifier 190 and a validation code 235, which is a unique identifier/code that serves to notify the client application that the archive request 160 has been received, properly validated and queued for subsequent batch process archiving. The validation response 234 is received by the client application 130 and serves to assure the user of the client application 130 that the document has been captured and validated and that subsequent batch processing archiving of the document will ensue. The validation response is typically received by the client application 130 a short period of time after submitting the archive request 160 (e.g., less than five seconds or the like).

The archiving application 220 additionally includes archive service layer 250 that is configured to perform batch archive processing of documents requiring archiving, in accordance with embodiments of the present invention. At a predetermined interval (e.g., once every 15 minutes or the like) a scheduler 252 creates an XML (eXtensible Markup Language) script or the like for a specific document type 254 with the parameters for a bulk job and executes the XML script to capture, for the designated specific document type 254, the index data 170 and image data 180 associated with documents 140 requiring archiving. The data records 244 in the first and second databases 50, 60 are updated to reflect a status code that indicates that the index data and image data has been captured for subsequent bulk archive processing. As necessary, the archive service layer 250 performs requisite file format conversion to convert the index data 170 and/or image data 180 to format conducive of bulk processing. Once the documents 140 (i.e., index data 170 and image data 180) have been captured from first and second databases 50, 60 the documents are combined into a batch file 260, such as a compressed file (ZIP file or the like). The batch file is delivered to the archive storage 500, which ingests the documents 140 including the index data 170 and the image data 180 into the storage (i.e., third memory 510 of archive storage 500). The archive service layer 250 updates the status codes in the document records 242, 244 of the first and second databases 50, 60 to reflect that the documents have been archived. An audit file is returned from the archive storage 500 to the archiving application 220 and, as required by the client application 130, forwarded to the client application 130. The audit file identifies each archive request and/or document included in the batch file archive process through inclusion of the unique request identifier 160 and validation code/identifier in the audit file.

Figure 3:
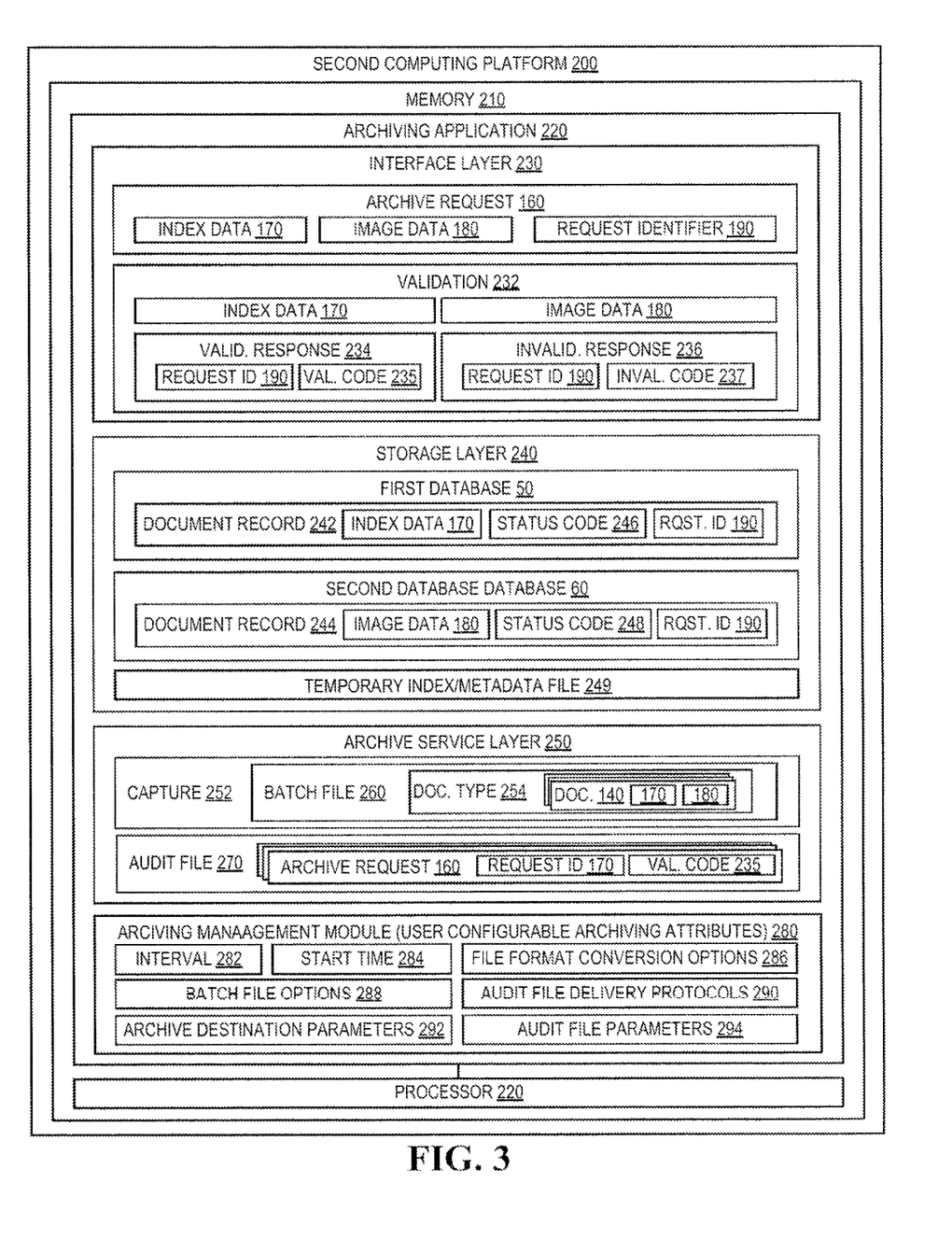
FIG. 3 provides a block diagram of a second computing platform configured for archiving documents and providing document-level archiving reconciliation, in accordance with embodiments of the invention.

Referring to FIG. 3 a more detailed block diagram of the second computing platform 200 is depicted, in accordance with embodiments of the present invention. In addition to providing more details to the archiving application 220, FIG. 3 provides various optional embodiments of the system. The second computing platform 200, which may comprise one or more apparatus, devices is configured to execute algorithms, such as applications, modules, routines, and the like. Computing platform 200 includes memory 210, which may comprise volatile and non-volatile memory, such as read-only and/or random-access memory (RAM and ROM), EPROM, EEPROM, flash cards, or any memory common to computer platforms). Moreover, memory 210 may comprise cloud storage, such as provided by a cloud storage service and/or a cloud connection service.

Further, computing platform 200 also includes processor 222, which may be an application-specific integrated circuit ("ASIC"), or other chipset, logic circuit, or other data processing device. Processor 222 may execute an application programming interface ("API") (not shown in FIG. 3) that interfaces with any resident programs, such as archiving application 220 or the like stored in the memory 210 of the second computing platform 200.

Processor 222 may include various processing subsystems (not shown in FIG. 3) embodied in hardware, firmware, software, and combinations thereof, that enable the functionality of the computing platform 200 and the operability of the computing platform 200 on the distributed computing network 20 (shown in FIGS. 1 and 2). For example, processing subsystems allow for initiating and maintaining communications and exchanging data with other networked devices. For the disclosed aspects, processing subsystems of processor 222 may include any subsystem used in conjunction with archiving application 220 and related sub-routines, algorithms, sub-algorithms, modules, sub-modules thereof.

Computer platform 200 may additionally include a communications module (not shown in FIG. 3) embodied in hardware, firmware, software, and combinations thereof, that enables electronic communications between the computing platform 200 and other platforms, apparatus and/or devices (shown in FIGS. 1 and 2). Thus, communication module may include the requisite hardware, firmware, software and/or combinations thereof for establishing and maintaining a network communication connection.

Memory 202 of computing platform 200 stores archiving application 220 that is executable by one or more second processors 222. An interface layer 230 of the archiving application is configured to receive the web service call 150 including the archive request 160 and validate 232 the index data 170 and image data 180 included in the archive request 160. Validation 232 may include, but is not limited to, verifying that the index data 170 is accurate (i.e., includes requisite data) and that the image data 180 is readable and able to be stored.

Archiving application 220 additionally includes storage layer 240 that includes one or more databases, such as first database 50 and second database 60. In specific embodiments of the invention, first database 50 may be configured to create and store a document record/entry 242 for each archive request 160 and store the index data 170 in the corresponding document record 242. Second database 60 is configured to create and store a document record/entry 244 for each archive request 160 and store the image data 180 in the corresponding document record 244.

The document record 242, 244 additionally includes a status code 246, 248 that indicates the status of the document's archive process. The status code 246, 248 is instrumental in assuring that the document is archived. In this regard, if a system error occurs that prevents a document from being archived (e.g., a database outage, a service down, a call failure or the like), the document will be re-processed in a subsequent scheduler 252 run (i.e., the next predetermined interval), since the status code 246, 248 in the document record 242, 244 indicates that the document has not yet completed the archive process. In the event that a service error occurs that may delay the archiving of the document, the archiving application 220 is configured to generate and initiate electronic communication of an alert to the client application 130 that informs the client of the delay in the archiving process. If the system error is determined to be a fatal error, the client application 130 may be notified in an alert to re-submit the archive request 160 at a later point in time (in order to allow for the system error to be corrected).

In the event that one of the databases is unavailable/down due to system outage or the like, the archiving application 130 is configured to create and temporarily store a text/metadata file 249 or, in some embodiments, an image file. Once the database becomes available again, the text/metadata file or image file is converted into a database record 242, 244 and normal processing ensues. Such creation of the temporary text/metadata file 249 and/or image file eliminates a database outage as a catastrophic failure point.

In response to validating 232 the index data 170 and the image data 180, the interface layer 230 of the archiving application is configured to generate and initiate communication of a validation response 234 to the client application 130. The validation response 234 includes, but is not limited to, the request identifier 190 and a validation code 235, which is a unique identifier/code that serves to notify the client application that the archive request 160 has been received, properly validated and queued for subsequent batch process archiving. The validation response 234 is received by the client application 130 and serves to assure the user of the client application 130 that the document has been captured and validated and that subsequent batch processing archiving of the document will ensue. The validation response is typically received by the client application 130 a short period of time after submitting the archive request 160 (e.g., less than five seconds or the like).

In response to the validation 232 resulting in invalid index data 170 and/or invalid image data 180, the interface layer 230 of the archiving application is configured to generate and initiate communication of an invalidation response 236 to the client application 130. The invalidation response 236 includes the request identifier and the invalidation code/identifier, which serves to identify to the user of the client application 130 the reason for invalidation and the need for the user to re-submit a new archive request for the document, which addressed the reason for invalidation (e.g., missing requisite data, illegible image or the like)

The archiving application 220 additionally includes archive service layer 250 that is configured to perform batch archive processing of documents requiring archiving, in accordance with embodiments of the present invention. At a predetermined interval (e.g., once every 15 minutes or the like) a scheduler 252 creates an XML (eXtensible Markup Language) script or the like for a specific document type 254 with the parameters for a bulk job and executes the XML script to capture, for the designated specific document type 254, the index data 170 and image data 180 associated with documents 140 requiring archiving. The data records 244 in the first and second databases 50, 60 are updated to reflect a status code that indicates that the index data and image data has been captured for subsequent bulk archive processing. As necessary, the archive service layer 250 performs requisite file format conversion to convert the index data 170 and/or image data 180 to a format acceptable to the bulk processing. Once the documents 140 (i.e., index data 170 and image data 180) have been captured from first and second databases 50, 60 the documents are combined into a batch file 260, such as a compressed file (ZIP file or the like). The batch file is delivered to the archive storage 500, which ingests the documents 140 including the index data 170 and the image data 180 into the storage. The archive service layer 250 updates the status codes 246, 248 in the document records 242, 244 of the first and second databases 50, 60 to reflect that the documents have been archived. As previously noted, if a system error prevents the completion of the archive process, the status code will not have been updated to reflect an archived status, and as such, those documents that did not get not archived will be re-processed in the subsequent next-in-time batch capture process, An audit file is returned from the archive storage to the archiving application 220 and, as required by the client application 130, forwarded to the client application 130. The audit file identifies each archive request and/or document included in the batch file archive process through inclusion of the unique request identifier 160 and validation code/identifier in the audit file.

The archiving application 220 may be additionally configured to include an archive management module 280 that is configured to allow a user (e.g., a client application user or administrator or the like) to manage and configure archiving attributes through presentation of one or more user interfaces. In this regard, the archiving management module 220 may define archiving attributes on a per-document type basis, a per-request basis or a per-client application basis. The archiving attributes that may configurable via the user interface include, but are not limited to, the predetermined interval 282 for batch processing; the start time 284 for a batch process; file format conversion options 286; batch file options 288 including compression file type; audit file delivery protocols 290, such as SFTP (Secure File Transfer Protocol), NDM (Network Data Mover), MQ (messaging Queue and the like; archive destination parameters 292 (so different types of documents can be delivered to different archive locations and the like); audit file and other reconciliation options 294 and the like Referring to FIG. 4, a flow diagram is presented of a method 600 for archiving documents including document-level reconciliation, in accordance with embodiments of the invention. At Event 602, a web-service call including an archive request is received. The archive request includes (i) index/metadata associated with the document, (ii) image data associated with a document and (iii) a unique request identifier that serves as a basis for tracking the archiving of the document. The synchronous front end of the archiving system is configured to be readily adaptable to accommodate any format of web service call, including but not limited to SOAP and RESTful web service calls. In specific embodiments of the method, prior to receiving the web service call, the web service is authenticated and routed to a specific URL associated with the archiving application/service.

Figure 4:
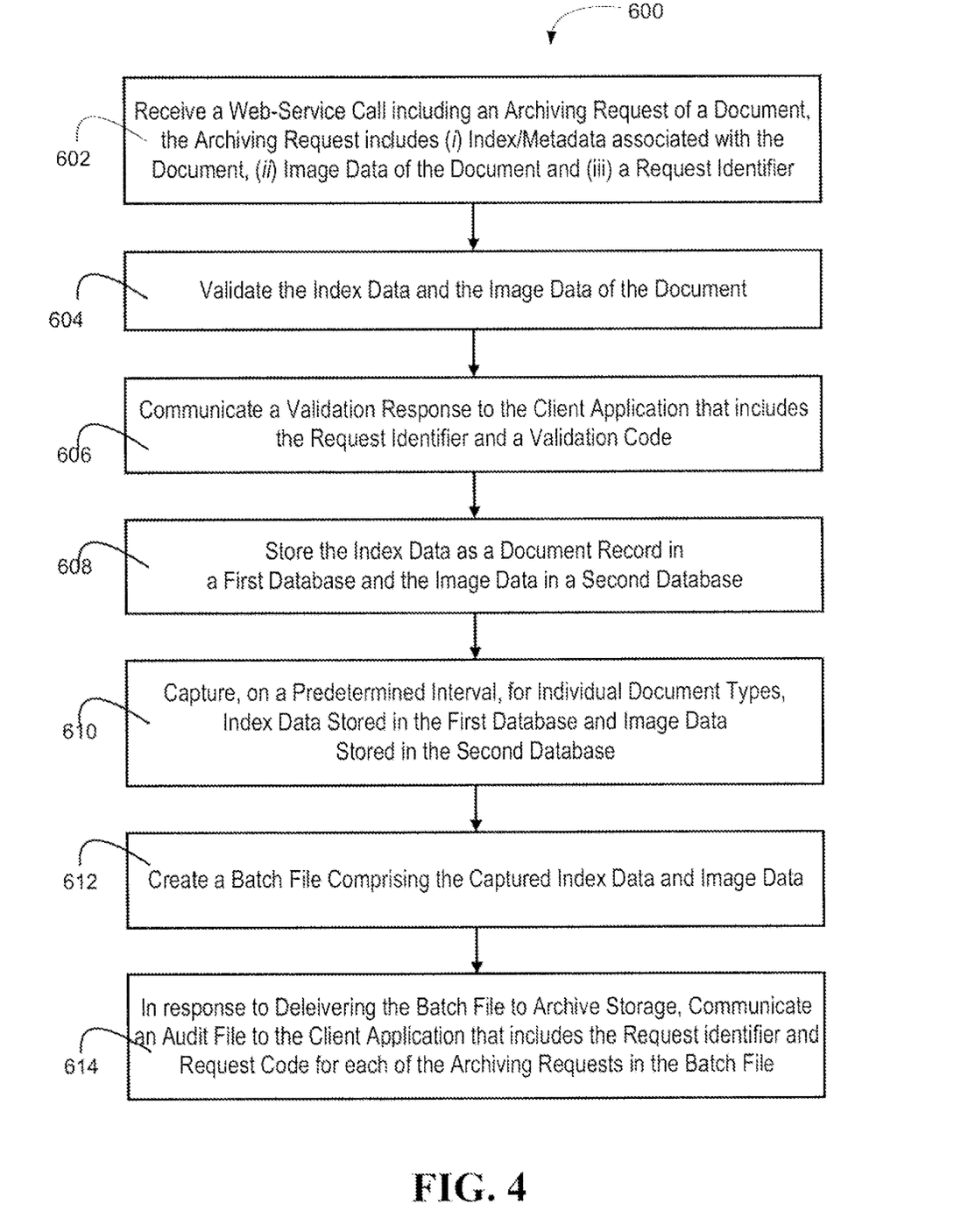
FIG. 4 provides a flow diagram of a method for archiving documents and providing document-level archiving reconciliation, in accordance with embodiments of the invention.

At Event 604, the index data and the image data are validated to insure that the index data includes requisite data in requisite format and that the image data legible and storable. At Event 606, a validation response is communicated to the client application that includes the request identifier and a validation code/identifier. By immediately responding to the web service call with a unique document ID (i.e., the request identifier) and a validation code, the client application system has notification that the document has been accepted in the archive process and that archiving will subsequent ensue. This allows for the client application to move to the next task required of the application.

At Event 608, the index data is stored in a document record/entry in a first database and the image data is stored in a second database. As previously noted, the document record/entry is configured to include a status code indicator that indicates the current status of the archiving process. The status code indicator is instrumental in insuring that the archive process is completed, in that status code indicators that do not indicate that the status code is completed, will be identified prior to a batch process run and, thus, the document will undergo re-processing (i.e., inclusion in a next-in-time archiving batch process) to complete the archiving process. In the event that the a database is unavailable or otherwise inoperable the index data may be stored in a temporary index/metadata file and subsequently converted to a document record/entry once the database becomes available or is otherwise determined to be operable.

It should be noted that the validation Event 604 and the validation response event 606 may occur prior to storing the index data and the image data in the databases or the validation Event 604 and/or validation response Event 606 may be configured to occur after the index data and the image data have been persisted to the databases.

At Event 610, at predetermined interval (i.e., a batch interval), for specific document types, index data stored in the first database and image data stored in the second database is collected/captured. Once collected/captured the data may be properly formatted for subsequent batch file conversion. In addition, once captured/collected the status code indicator is updated to reflect that the data has been collected/captured.

At Event 612, the batch file is created that comprises the documents collected (i.e., the index and image data). The batch file is created in a compression file format, such as a ZIP file or the like. At Event 614, in response to delivering the batch file to the archive storage, an audit file is received from the archive storage and, as required, communicated to the client application. The audit files identifies the documents/archive requests in the batch file by the request identifier and the validation code/identifier. In addition, the status code indicator in the document record is updated to reflect that the archive process has been completed. The client application will receive the audit file within a period of time during which the user is likely to be still engaged with the client application (e.g., within an hour or less).

Figure 5:
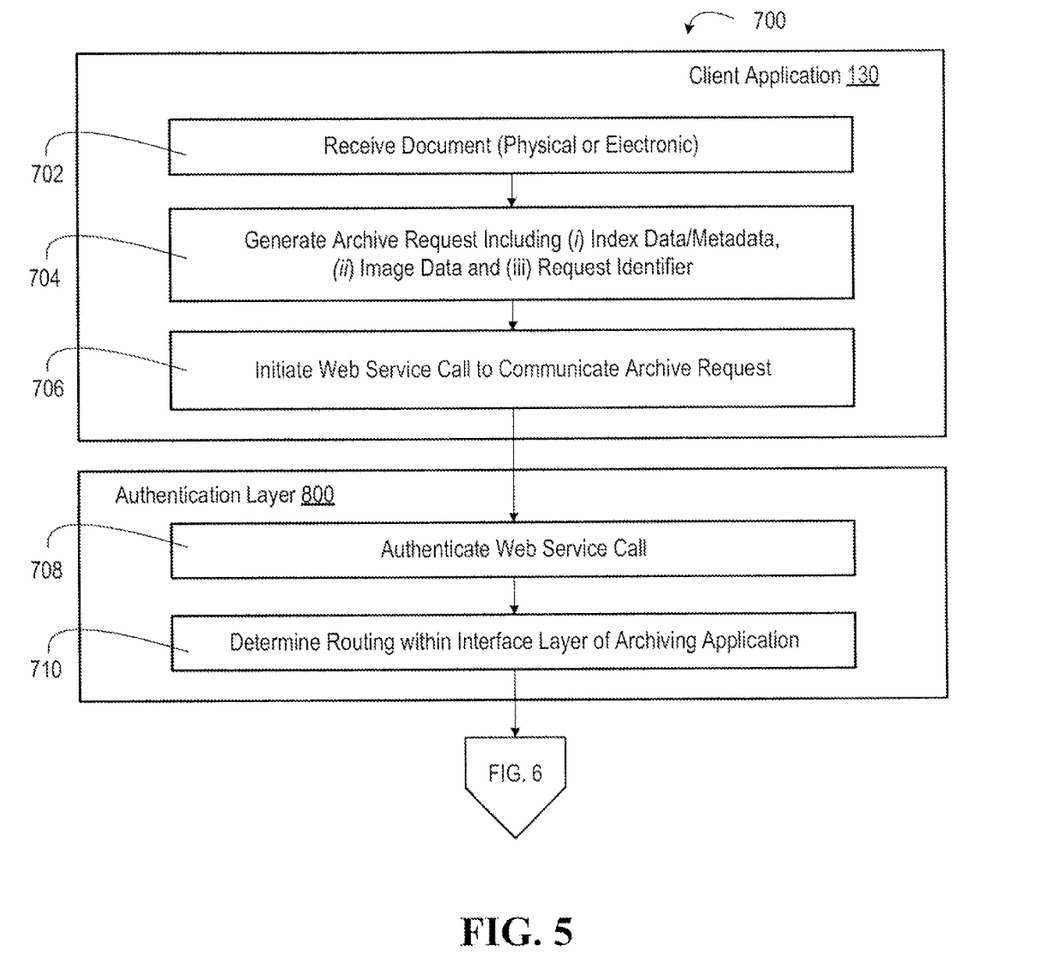
FIGS. 5-7 provide a more detailed flow diagram of a method for archiving documents and providing document-level archiving reconciliation, in accordance with embodiments of the invention.
Figure 6:
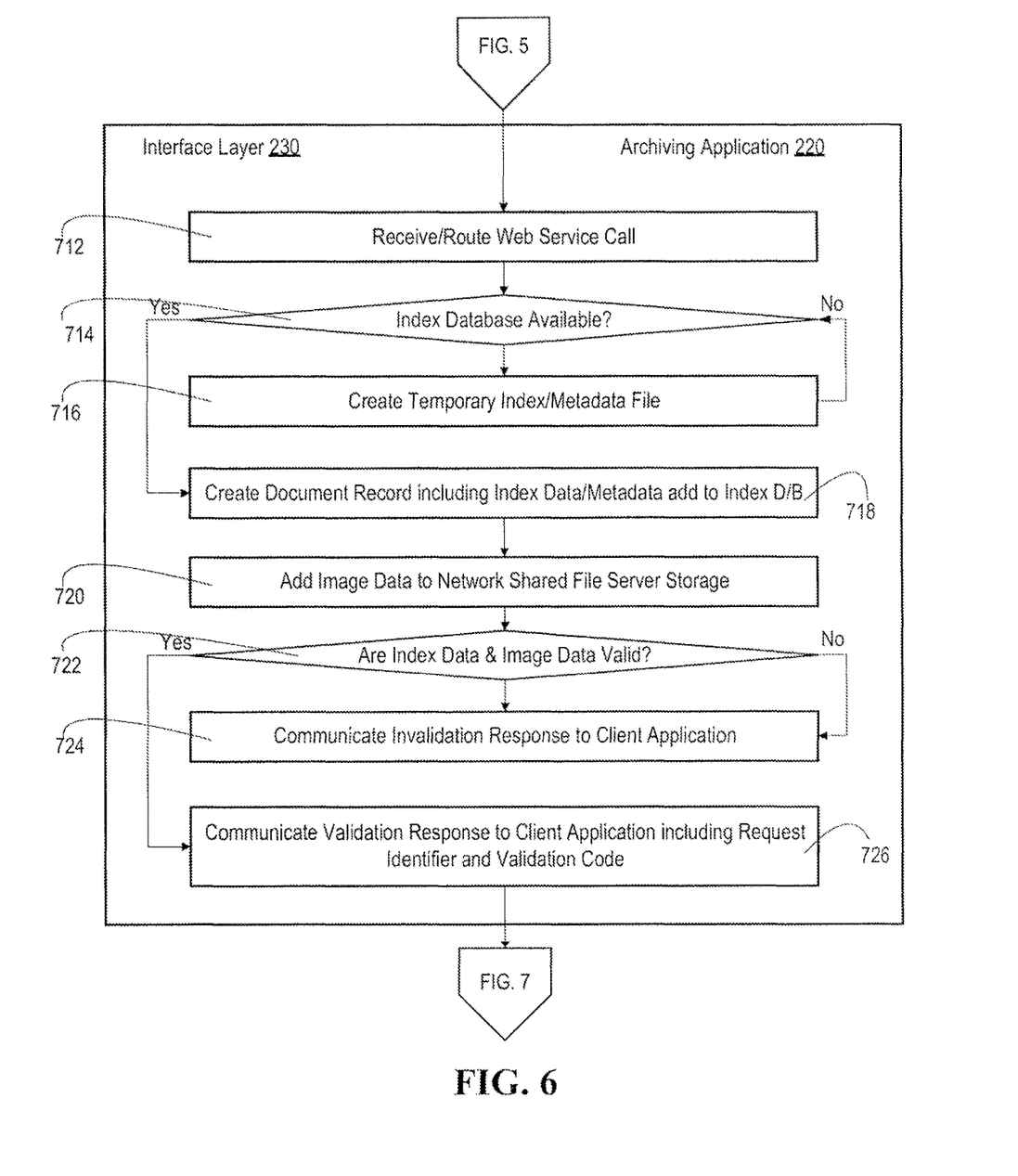
Figure 7:
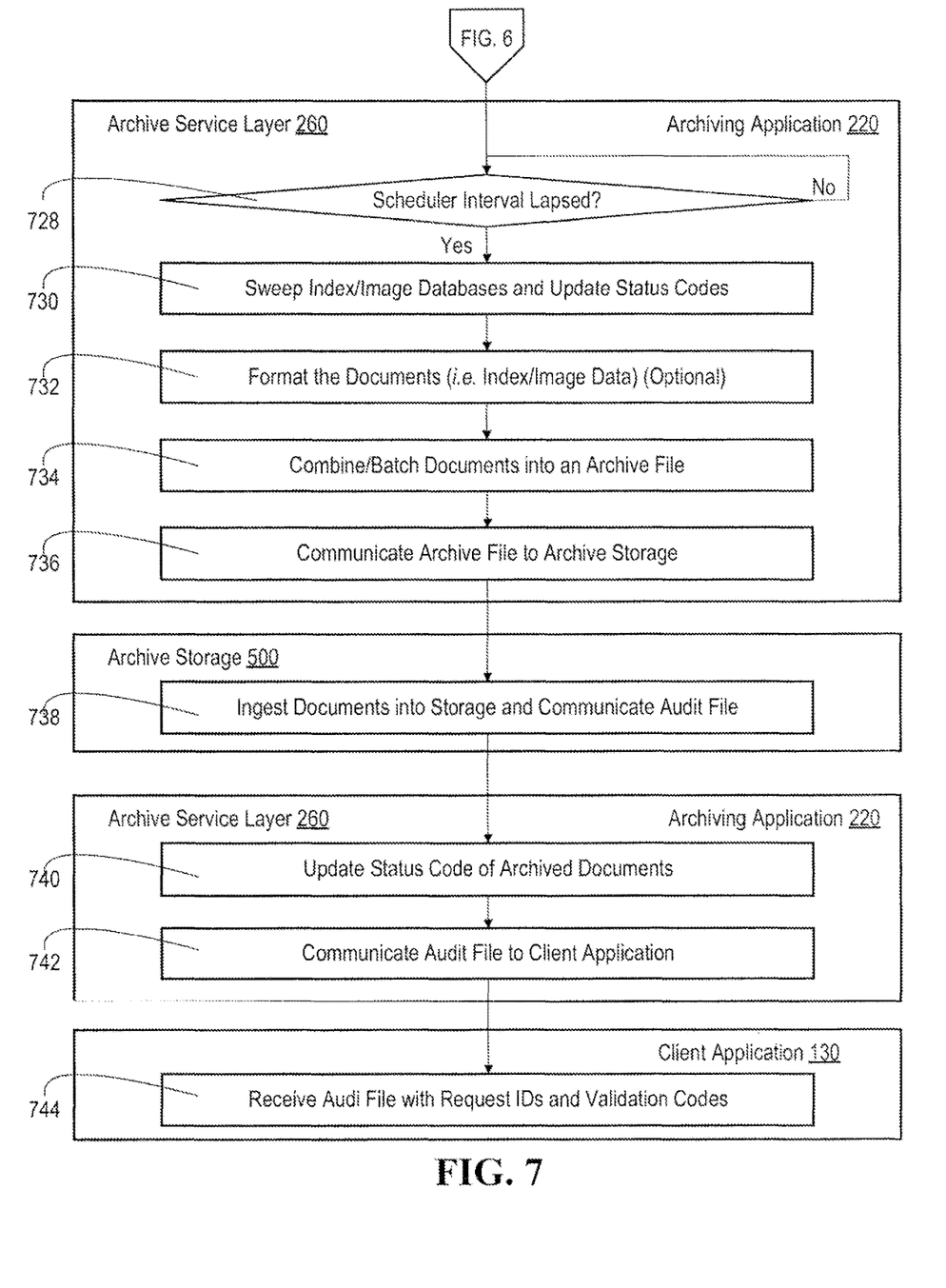

Referring to FIGS. 5-7 is a more detailed flow diagram is presented of a method 700 for archiving documents and providing archiving reconciliation, in accordance with embodiments of the present invention. Referring to FIG. 5, Events 702-706 are conducted by a client application 130. At Event 702, a client application receives a document. The document may be a physical/paper document that is captured (e.g., scan, photographed or the like) by the client application or an electronic document otherwise received via a communication network. At Event 704, an archive request is generated that includes (i) index/metadata associated with the document, (ii) image data associated with a document and (iii) a unique request identifier that serves as a basis for tracking the archiving of the document.

At Event 706 a web-service call is initiated to communicate the archive request to the archiving application 220. The web-service call may be a SOAP or RESTful web service calls or any other formatted web service call as adapted by the archiving application 220.

Events 708-710 are conducted by an authentication layer 800, such as EIB (Enterprise Interface Builder) and/or DGW (Data GateWay) or any other suitable middleware. At Event 708, the authorization layer 800 authenticates the web service call (i.e., verifies that web service call is coming from an authorized client) and, at Event 710, once authenticated, the authorization layer 800 determines routing of the web service call to a specific URL (Universal resource Locator) associated with the archiving application and initiates a web service call to the archiving application 220 on behalf of the client application 130.

Referring to FIG. 6, Events 712-724 are conducted by the interface layer 230 of the archiving application 220. At Event 712, the archiving application 220 receives the web service call. At Event 714, a determination is made as to whether the index database is available. If the database is determined to be available, at Event 718, a document record is created that includes the index data/metadata in the archive request and a status code indicator and the document record/entry is stored in the index database. If the database is determined to be unavailable, at Event 716, a temporary index/metadata file (i.e., text file) is created and stored. Once the index database is determined to be available, the temporary index/metadata file is converted to a document record/entry and stored in the index database. Such creation of a temporary index/metadata file provides for the archiving process to continue even though the index database being is unavailable; thus, preventing an unavailable database from being an event that would cause the archive process to otherwise fail. At Event 720, the image data from the archive request is persisted to an image database, such as a Network Attached Storage (NAS) (i.e., shared file system) or the like.

At Event 722, a determination is made as to whether the index data and the image data are valid (e.g., correct and accurate index attributes and readable image and the like). If the index data and image data are determined to be valid, at Event 726, a validation response is communicated to the client application 130 that includes the request identifier and a validation code/identifier. By immediately responding to the web service call with a unique document ID (i.e., the request identifier) and a validation code/identifier, the client application system has notification that the document has been accepted in the archive process and that archiving will subsequently ensue. This allows for the client application to move to the next task required of the application. Such a validation response is generally received by the client application shortly after submitting the archive request (e.g., within 3 seconds of submitting the archive request). If the index data or the image data are determined to be invalid, at Event 724, an invalidation response is communicated to the client application that includes the request identifier and an invalidation code that notifies the client of the reason for the invalidation. In response to receiving the invalidation response, the client application is required to re-submit a new archive request that addresses the reason for invalidation (e.g., includes all required index data, legible image, or the like). As previously discussed, the validation determination and subsequent communication of validation or invalidation responses may occur prior to persisting the index data and image data in databases (Events 714-720) or, as depicted in FIG. 6, after the index data and image data are stored in the respective databases.

Referring to FIG. 7, Events 728-736 and 740-742 are conducted by an archive service layer 260 of an archiving application 220. At Event 728, a determination is made as to whether the scheduler interval has lapsed. As previously discussed, the scheduler operates on a predetermined interval to collect/capture documents in the databases that have not previously been archived (i.e., documents that have entered the databases since the last collection period or documents that failed to be archived previously as indicated by the status code indicator in the document record). If a determination is made that the scheduler interval has lapsed, at Event 730, the index data and image data are collected from the respective databases (i.e., a database sweep occurs) and the status code indicators in the document record are updated to reflect that the index/image data has been collected from the databases.

At optional Event 732, the index data and/or image data is properly formatted, on an as needed basis, for subsequent bulk/archive file creation. At Event 734, documents of a same type are combined and an archive/batch file is created. In specific embodiments of the invention, the archive/batch file is a compression file, such as a ZIP file or the like. At Event 736, the archive/batch file is communicated to the archive storage.

At Event 738, which is conducted at the archive storage 500, the archive/batch file is received by the archive storage 500 and the documents in the archive/batch file and ingested into the archive storage system. In addition, the archive storage 500 communicates an audit file to the arching application 220.

At Event 740, upon receipt of the audit file, the archive service layer 260 of the archiving application 220, updates the status code indicator in the document records to indicate that the archive has been completed and, at Event 742, as required by the client, initiates communication of the audit file to the client application.

At Event 744, the client application receives the audit file, identifies the documents/archive requests in the batch file by the request identifier and the validation code/identifier. The client application will typically receive the audit file within a period of time during which the user is likely to be still engaged with the client application (e.g., within an hour or less).

Thus, as described above, embodiments of the present invention provide for synchronous document captures into an asynchronous archive and document-level reconciliation of the archive process. Once a document requiring archiving has been captured and validated, the client is immediately notified that the document has been accepted into the archiving system and that archiving will ensue. Once the batch mode archiving process has been completed, the client is notified, at the document/individual request-level of the completion of the archive process. Additionally, in specific embodiments of the invention, the archiving system is transparent to the clients in terms of system changes, capable of self-mitigating system errors and/or notifying clients of system errors, adaptable to allow for any format of web service call requesting document archiving, allows for different types of documents having different index/metadata to be processed without a database schema change and allows users to configure archive process attributes on a per document, or per document-type basis.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for archiving documents and subsequent reconciliation of the archiving, the system comprising:
   a first computing platform having a first memory and one or more first processors in communication with the first memory;
   a client application stored in the first memory, executable by the one or more first processors and configured to:
      capture a document requiring archiving,
      initiate a Simple Object Access Protocol (SOAP) or Representation State Transfer (RESTful) web service call for communicating an archiving request wherein the archiving request includes (i) index data associated with the document, (ii) image data of the document, and (iii) a request identifier that identifies the archiving request;

a second computing platform having a second memory and one or more second processors in communication with the second memory;

an archiving application stored in the second memory, executable by the one or more second processors and including:

an interface layer configured to:
receive the web service call including the archiving request,
perform validation of correctness and accuracy of the index data and readability of the image data of the document, and
in response to validating the index data and the image data, communicate a validation response to the client application that includes the request identifier and a validation code;
in response to invalidation at least one of the index data or the image data, communicate an invalidation response to the client application that includes the request identifier and an invalidation code that indicates a reason for the invalidation, wherein one of the validation response or the invalidation response is communicated to the client application within five seconds of the client application communicating the archiving request;
determine that a first database for storing the index data is in an unavailable state;
in response to determining that the first database is in an unavailable state, store the index data in a temporary object file;
determine that the first database has moved from the unavailable state to an available state;
in response to determining that the first database has moved from the unavailable state to an available state, convert the temporary object file into a document record;

a storage layer configured to:
store the document record including the index data in the first database and the image data in a second database; and an archiving service layer configured to:
create an eXtensible Markup Language (XML) script specific to a document type and execute the script, on a predetermined interval, to capture index data stored in the first data database and associated image data stored in the second database, wherein the captured index data and image data is specific to the document type and associated with a plurality of archiving requests,
create a batch file comprising the captured index data and image data, and
in response to delivering the batch file to archive storage, receive and communicate an audit file to the client application that includes the request identifier and validation code for each of the plurality of archiving requests.

2. The system of claim 1, wherein the archiving application further comprises a user interface module configured to allow a user to define a batch processing attributes based on document type.

3. The system of claim 2, wherein batch processing attributes include one or more of the predetermined interval, a batch processing start time, file format conversion options, batch file options, audit file delivery protocols, archive destination parameters and auditing parameters.

4. The system of claim 1, further comprising:
a third computing platform having a third memory and one or more third processors
an authentication application stored in the third memory, executable by the third processors and including:
an authentication layer configured to:
receive the web service call from the client application, and
authorize the client application to conduct the web service call with the archiving application; and
a routing layer configured to:
determine and route the web service call to a designated location within the interface layer of the archiving application.

5. The system of claim 1, wherein the archiving service layer is further configured to:
in response to determining that a system error is occurring that affects interface layer processing, capture, during a next-in-time predetermined interval, the index data stored in the first data database and the associated image data stored in the second database.

6. The system of claim 1, wherein the archiving application is further configured to:
in response to determining that a system error is occurring that affects interface layer processing, generate and communicate an alert to at least the client application that notifies the client application of a delay in processing the archive request or requests that the archive request be re-sent at a later point in time.

7. The system of claim 1, wherein the archiving service layer is further configured to:
identify a client application-specific protocol for communicating the audit file, and
communicate the audit file to the client application via the client application specific protocol.

8. The system of claim 1, wherein the archiving service layer is further configured to:
in response to delivering the batch file to archive storage and receiving the audit file, update a database status code in the document record for each document in the batch file to indicate completion of archiving or a failure to archive.

9. The system of claim 1, wherein the interface layer of the archiving application is configurable to receive the web service call in any one of a plurality of web service formats.

10. A method for archiving documents and subsequently reconciling the archiving, the method implemented by one or more computing processors and comprising:
receiving, from a client application, a Simple Object Access Protocol (SOAP) or Representation State Transfer (RESTful) web service call including archiving request for a document, wherein the archiving request includes (i) index data associated with the document, (ii) image data of the document, and (iii) a request identifier that identifies the archiving request;
performing validation of correctness and accuracy of the index data and readability of the image data of the document;
in response to validating the index data and the image data, communicating a validation response to the client application that includes the request identifier and a validation code;
in response to invalidation at least one of the index data or the image data, communicating an invalidation response to the client application that includes the request identifier and an invalidation code that indicates a reason for the invalidation wherein one of the validation response or the invalidation response is communicated to the client application within five seconds of the client application communicating the archiving request;
determining that a first database for storing the index data is in an unavailable state;
in response to determining that the first database is in an unavailable state, storing the index data in a temporary object file;
determining that the first database has moved from the unavailable state to an available state;
in response to determining that the first database has moved from the unavailable state to an available state, converting the temporary object file into a document record;
storing the document record including the index data and the validation code in the first database and the image data and the validation code in a second database;
creating an eXtensible Markup Language (XML) script specific to a document type and executing the script, on a predetermined interval, to capture index data stored in the first data database and associated image data stored in the second database, wherein the captured index data and image data is specific to the document type and associated with a plurality of archiving requests,
creating a batch file comprising the captured index data and image data, and
in response to delivering the batch file to archive storage, communicating an audit file to the client application that includes the request identifier and validation code for each of the plurality of archiving requests.

11. The method of claim 10, further comprising:
providing a user interface configured to allow a user to define a batch processing attributes based on document type, wherein the batch processing attributes include one or more of the predetermined interval, a batch processing start time, file format conversion options, batch file options, audit file delivery protocols, archive destination parameters and auditing parameters.

12. The method of claim 10, further comprising:
prior to receiving the web service call:
authorizing the web service call; and
determining routing for the web service call.

13. The method of claim 10, further comprising:
in response to determining that a system error is occurring that affects interface layer processing:
capturing, during a next-in-time predetermined interval, the index data stored in the first data database and the associated image data stored in the second database; and
generating and initiating communication of an alert to at least the client application that notifies the client application of a delay in processing the archive request or requests that the archive request be re-sent at a later point in time.

14. A computer program product including a non-transitory computer-readable medium, the computer-readable medium comprising:
a first set of codes for causing a computer to receive a Simple Object Access Protocol (SOAP) or Representation State Transfer (RESTful) web service call requesting archiving of a document, wherein the archiving request includes (i) index data associated with the document, (ii) image data of the document, and (iii) a request identifier that identifies the archiving request;
a second set of codes for causing a computer to perform validation of correctness and accuracy of the index data and readability of the image data of the document;
a third set of codes for causing a computer to communicate, in response to validating the index data and the image data, a validation response to the client application that includes the request identifier and a validation code or communicate, in response to invalidation at least one of the index data or the image data, an invalidation response to the client application that includes the request identifier and an invalidation code that indicates a reason for the invalidation, wherein one of the validation response or the invalidation response is communicated to the client application within five seconds of the client application communicating the archiving request;
a fourth set of codes for causing a computer to (i) determine that a first database for storing the index data is in an unavailable state, (ii) in response to determining that the first database is in an unavailable state, store the index data in a temporary object file, (iii) determine that the first database has moved from the unavailable state to an available state, (iv) in response to determining that the first database has moved from the unavailable state to an available state, convert the temporary object file into a document record;
a fifth set of codes for causing a computer to store the document record including the index data in the first database and the image data in a second database;
a sixth set of codes for causing a computer to create an eXtensible Markup Language (XML) script specific to a document type and execute the script, on a predetermined interval, to capture index data stored in the first data database and associated image data stored in the second database, wherein the captured index data and image data is specific to the document type and associated with a plurality of archiving requests;
a seventh set of codes for causing a computer to create a batch file comprising the captured index data and image data; and
an eighth set of codes for causing a computer to, in response to delivering the batch file to archive storage, communicate an audit file to the client application that includes the request identifier and validation code for each of the plurality of archiving requests.

15. The computer program product of claim 14, wherein the computer-readable medium further comprises:
an eighth set of codes for causing a computer to present a user interface configured to allow a user to define a batch processing attributes based on document type, wherein the batch processing attributes include one or more of the predetermined interval, a batch processing start time, file format conversion options, batch file options, audit file delivery protocols, archive destination parameters and auditing parameters.

* * * * *